(12) United States Patent
Jang et al.

(10) Patent No.: US 8,333,928 B2
(45) Date of Patent: Dec. 18, 2012

(54) FLUIDIZING BED APPARATUS FOR PRODUCING CARBON NANOTUBES AND CARBON NANOTUBE PRODUCTION FACILITY AND METHOD USING THE SAME

(75) Inventors: Suk-Won Jang, Seoul (KR); Chung-Heon Jeong, Gyeonggi-do (KR); Jong-Kwan Jeon, Gyeonggi-do (KR); Ho-Soo Hwang, Gyeonggi-do (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 927 days.

(21) Appl. No.: 12/290,926

(22) Filed: Nov. 4, 2008

(65) Prior Publication Data
US 2009/0169465 A1 Jul. 2, 2009

(30) Foreign Application Priority Data
Dec. 31, 2007 (KR) .................. 10-2007-0141259

(51) Int. Cl.
*B01J 8/24* (2006.01)
*B01J 8/38* (2006.01)

(52) U.S. Cl. ........ 422/139; 422/143; 422/145; 422/146; 422/147; 977/843

(58) Field of Classification Search .................. 422/139, 422/143, 145, 146, 147; 977/843
See application file for complete search history.

(56) References Cited

U.S. PATENT DOCUMENTS

| | | | | |
|---|---|---|---|---|
| 3,734,469 A | * | 5/1973 | Goldstein et al. | 366/327.2 |
| 3,890,935 A | * | 6/1975 | Moss et al. | 122/4 D |
| 4,095,307 A | * | 6/1978 | Brubaker | 15/246.5 |
| 4,378,240 A | * | 3/1983 | Siegle et al. | 75/348 |
| 5,683,178 A | * | 11/1997 | Nakamoto et al. | 366/325.3 |
| 2004/0151654 A1 | * | 8/2004 | Wei et al. | 423/447.3 |
| 2006/0099134 A1 | * | 5/2006 | Maruyama et al. | 423/447.1 |
| 2007/0264187 A1 | * | 11/2007 | Harutyunyan et al. | 423/447.3 |
| 2008/0233041 A1 | * | 9/2008 | Jang et al. | 423/445 B |

FOREIGN PATENT DOCUMENTS

| | | |
|---|---|---|
| CN | 1817791 A | 8/2006 |
| CN | 101049927 A | 10/2007 |
| EP | 1375424 A1 * | 1/2004 |
| JP | 59156425 A * | 9/1984 |
| JP | 2004/076196 A | 3/2004 |
| KR | 20-0398200 Y1 | 10/2005 |
| KR | 2007-0050291 | 5/2007 |
| KR | 2007-0064110 | 6/2007 |
| KR | 2007-0073395 | 7/2007 |
| KR | 10-0824301 B1 | 4/2008 |

OTHER PUBLICATIONS

English Abstract for JP 59-156425 A (Sep. 1984).*

* cited by examiner

*Primary Examiner* — Jennifer A Leung
(74) *Attorney, Agent, or Firm* — Kilpatrick Townsend & Stockton LLP

(57) ABSTRACT

Provided is an apparatus for producing carbon nanotubes. The apparatus includes a reaction chamber and a rotating member. The reaction chamber provides a reaction space in which metal catalysts and a source gas react with one another to produce carbon nanotubes. The rotating member increases fluidizing of the metal catalysts in the reaction space to increase productivity and raise the gas conversion rate, thereby reducing the price of carbon nanotubes and preventing adhering of metal catalysts to the sidewall of the reaction chamber.

19 Claims, 15 Drawing Sheets

FLUIDIZING BED APPARATUS FOR PRODUCING CARBON NANOTUBES AND CARBON NANOTUBE PRODUCTION FACILITY AND METHOD USING THE SAME

CROSS-REFERENCE TO RELATED APPLICATION

This U.S. non-provisional patent application claims priority under 35 U.S.C. §119 of Korean Patent Application No. 10-2007-0141259, filed on Dec. 31, 2007, the entire contents of which are hereby incorporated by reference.

BACKGROUND OF THE INVENTION

The present invention disclosed herein relates to a carbon nanotube production facility, and more particularly, to an apparatus for fluidizing metal catalyst particles to produce carbon nanotubes, and a carbon nanotube production facility and method.

Carbon nanotubes are produced by bonding three carbon atoms adjacent to one carbon atom to form a hexagonal ring shape, and these hexagonal rings are bonded to form a flat, hexagonal beehive lattice, which is then rolled into a cylindrical or tubular shape.

Depending on its projection, a carbon nanotube is a material characterized by its ability to exhibit conductivity of metal or conductivity of semiconductors, is widely applicable in many technical fields, and is being heralded as the new material of the future. For example, carbon nanotubes can be applied to terminals of electrochemical storage devices such as secondary cells, fuel cells, and super capacitors, to electromagnetic radiation blocking devices, field emission displays, and gas sensors.

Methods for producing carbon nanotubes are diverse, and include electrical discharge, laser deposition, and thermal decomposition vapor deposition. As mass production of carbon nanotubes has recently become an issue, technology utilizing a fluidizing bed reactor conducive to large-scale integration is being favored. Technology utilizing a fluidizing bed reactor involves a method of dispersing and reacting metal catalyst particles and a hydrocarbon-based source gas in a high temperature reactor to generate carbon nanotubes. That is, carbon nanotubes are grown on metal catalysts by suspending the metal catalyst in the source gas inside the reactor and thermally decomposing the source gas.

However, this production technology utilizing a fluidizing bed reactor is a technology still in its infancy, which some institutes are only beginning to research, and therefore, its use in mass-production applications is currently unfeasible.

SUMMARY OF THE INVENTION

The present invention provides an apparatus capable of mass-producing carbon nanotubes, and a carbon nanotube mass-production facility and method.

The present invention also provides an apparatus for producing carbon nanotubes capable of preventing reaction-induced adherence to an inner wall of a reaction chamber, and a carbon nanotube mass-production facility and method.

The present invention also provides an apparatus for producing carbon nanotubes that increases circulation of metal catalysts, and a carbon nanotube mass-production facility and method.

The present invention also provides an apparatus for producing carbon nanotubes capable of continuous production, and a carbon nanotube mass-production facility and method.

The present invention also provides an apparatus for producing carbon nanotubes capable of increasing yield, and a carbon nanotube mass-production facility and method.

Objects of the present invention are not limited hereto, and those skilled in the art can readily decipher from the description below that the present invention encompasses other objects not specifically mentioned herein.

Embodiments of the present invention provide apparatuses for producing carbon nanotubes, including: a reaction chamber providing a reaction space in which metal catalysts and a source gas react with one another to produce carbon nanotubes; and a rotating member increasing fluidizing of the metal catalysts in the reaction space and preventing adhering of metal catalysts to the sidewall of the reaction chamber.

In some embodiments, the rotating member may include a rotating frame rotating at edges of the reaction space to increase fluidizing.

In other embodiments, the rotating member may include: downward wings generating a downward current from an upper portion to a lower portion of the reaction space to prevent small metal catalyst particles escaping from the upper portion of the reaction space; and upward wings generating an upward current from the lower portion to the upper portion of the reaction space to prevent large metal catalyst particles from settling to the lower portion of the reaction space.

In still other embodiments, the rotating member may include: a driver; a rotating shaft installed in the reaction space of the reaction chamber, and receiving rotational force from the driver; and a rotating frame installed on the rotating shaft to rotate along the edges of the reaction space.

In even other embodiments, the rotating frame may include: supports connected to the rotating shaft; and blades connected to the supports and disposed proximate to a sidewall of the reaction chamber, for physically removing metal catalysts adhered to the sidewall of the reaction chamber.

In yet other embodiments, the rotating member may have at least two of the rotating frame installed thereon along a length of the reaction space.

In further embodiments, the rotating member may further include downward wings installed on an upper end of the rotating frame to generate a downward current from an upper portion to a lower portion of the reaction space, and upward wings installed on a lower end of the rotating frame to generate an upward current from a lower portion to an upper portion of the reaction space.

In still further embodiments, the reaction chamber may further include a dispersion plate that disperses source gas into the reaction space, and the rotating member may further include a floor blade disposed proximate to the dispersion plate to sweep metal catalysts accumulating on the dispersion plate and prevent channeling from metal catalysts accumulating on the dispersion plate.

In even further embodiments, the reaction chamber may further include a dispersion plate partitioning the reaction space from a preheating space that preheats source gas before the source gas enters the reaction space, and the dispersion plate may define diffusion holes through which source gas is dispersed into the reaction space.

In yet further embodiments, the reaction chamber may further include a mesh for preventing metal catalysts from falling through the dispersion plate into the preheating space.

In some embodiments, the fluidizing bed apparatus may further include: an upper heater installed outside the reaction space; and a lower heater installed outside the preheating space, wherein the upper heater may be provided at an upper portion of the dispersion plate, and the lower heater may be provided at a lower portion of the dispersion plate.

In other embodiments of the present invention, facilities for producing carbon nanotubes include: a fluid synthesizing apparatus including a reaction chamber including a reaction space in which metal catalysts and source gas react with one another to produce carbon nanotubes; a catalyst supply unit for supplying metal catalysts to the fluid synthesizing apparatus; and a recovery unit for recovering carbon nanotubes produced in the fluid synthesizing apparatus, wherein the fluid synthesizing apparatus includes a rotating member for preventing metal catalysts from adhering to a sidewall of the reaction chamber.

In some embodiments, the catalyst supply unit may include: an input device for inputting metal catalysts in the reaction chamber; a supplying device for supplying metal catalysts to the input device; and a first storage device for storing metal catalysts to be supplied to the supplying device.

In other embodiments, the supplying device may include: a discharge part for storing metal catalysts and supplying a predetermined quantity of metal catalysts to the input device; an upper closing plate and a lower closing plate at an upper portion of the discharge part to define a set quantity space to be filled with a preset amount of supplied metal catalysts, the upper and lower closing plates defining the set quantity space by moving to open and close a top and bottom thereof, and a driving member for selectively moving the upper closing plate and the lower closing plate.

In still other embodiments, the first storage device may include: a first storage tank including a storage space for storing metal catalysts, and a passage connected to the supplying device; and a pushing device for pushing metal catalysts stored in the first storage tank into the passage.

In even other embodiments, the input device may include an input pipe that uses pressure of inactive gas to input metal catalysts to the reaction chamber.

In yet other embodiments, the input device may further include an oscillator that applies vibrations to the input tank to facilitate extrusion of metal catalysts filled in the input tank into the input pipe.

In further embodiments, the rotating member may include: a driver; a rotating shaft installed in the reaction space of the reaction chamber, for receiving rotational force from the driver; and a rotating frame installed on the rotating shaft to rotate along edges of the reaction space.

In still further embodiments, the rotating frame may include: blades disposed proximate to a sidewall of the reaction chamber, to sweep and remove metal catalysts adhered to the sidewall of the reaction chamber; downward wings for generating a downward current from an upper portion to a lower portion of the reaction space to prevent escaping of small metal catalyst particles from the upper portion of the reaction space; and upward wings for generating an upward current from the lower portion to the upper portion of the reaction space to prevent large metal catalyst particles from settling to the lower portion of the reaction space.

In even further embodiments, the reaction chamber may include a dispersion plate for diffusing source gas into the reaction space, and the rotating member may further include a floor blade disposed proximate to the dispersion plate to prevent occurrence of channeling from accumulation of metal catalysts on the dispersion plate, through sweeping metal catalysts accumulating on the dispersion plate.

In yet further embodiments, the reaction chamber may include: a reaction space in which metal catalysts and source gas react with one another to produce carbon nanotubes; a preheating space that is preheated before source gas enters the reaction space; and a dispersion plate that partitions the preheating space and the reaction space, and discharges source gas into the reaction space.

In some embodiments, the reaction chamber may further include a heater installed on an outside thereof, the heater separated into an upper heater and a lower heater disposed above and below the dispersion plate, respectively.

In other embodiments, the facility may further include an exhaust unit for exhausting exhaust gas generated during production of carbon nanotubes by the fluid synthesizing apparatus, wherein the exhaust unit may include: a cyclone that collects metal catalysts exhausted together with exhaust gas; and a scrubber that removes and cleans exhaust gas that passes through the cyclone.

In still other embodiments, the cyclone may include: a cylindrical cyclone body; an intake pipe for suctioning exhaust gas including metal catalysts into the cyclone body; an exhaust pipe for exhausting only exhaust gas after the suctioned exhaust gas and metal catalysts are separated from each other; and a collection chamber for collecting separated metal catalysts discharged therein.

In yet other embodiments, the recovery unit may use negative pressure to recover carbon nanotubes produced in the reaction chamber.

In even other embodiments, the recovery unit may include: a recovery tank; and a negative pressure generating member for generating negative pressure in an internal space of the recovery tank.

In further embodiments, the recovery unit may further include an electromagnet for retaining carbon nanotubes recovered in the recovery tank, to prevent carbon nanotubes from being blown around by the negative pressure generating member, and a cooling member for preventing combustion of carbon nanotubes.

In still further embodiments, the recovery unit may further include: a large-capacity storage tank; and a transferring member for transferring carbon nanotubes in the recovery tank to the large-capacity storage tank through a descension method, a pressurizing method, or an electromagnetic method.

In still other embodiments of the present invention, a method for producing carbon nanotubes, includes: heating a reaction chamber in a vacuum state; and performing fluid synthesis to produce carbon nanotubes through supplying source gas and metal catalysts into a reaction space of the reaction chamber, wherein the performing of the fluid synthesis includes forcibly generating circulation at a sidewall of the reaction chamber through rotating a rotating member installed in the reaction space, to prevent metal catalysts from adhering to the sidewall of the reaction chamber.

In some embodiments, the metal catalysts that are filled in an input device may be supplied to the reaction chamber using pressure of an inactive gas or vacuum that is negative pressure in the reaction chamber.

In other embodiments, the method may further include recovering of carbon nanotubes produced in the reaction chamber, wherein the recovering of the carbon nanotubes may include: discontinuing the supplying of the source gas, generating atmospheric pressure in the reaction chamber by supplying inactive gas therein, and then recovering carbon nanotubes from the reaction chamber to the recovery unit using negative pressure.

In even other embodiments, the recovering of the carbon nanotubes may further include cooling the recovery unit to lower a temperature of the carbon nanotubes.

In still other embodiments, the heating of the reaction chamber may include maintaining a temperature of a dispersion plate that disperses source gas into the reaction space at a temperature below a temperature of the reaction space.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Preferred embodiments of the present invention will be described below in more detail with reference to attached FIGS. 1 through 11. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Thus, the dimensions of elements in the figures are exaggerated for clarity of illustration.

Figure 1:
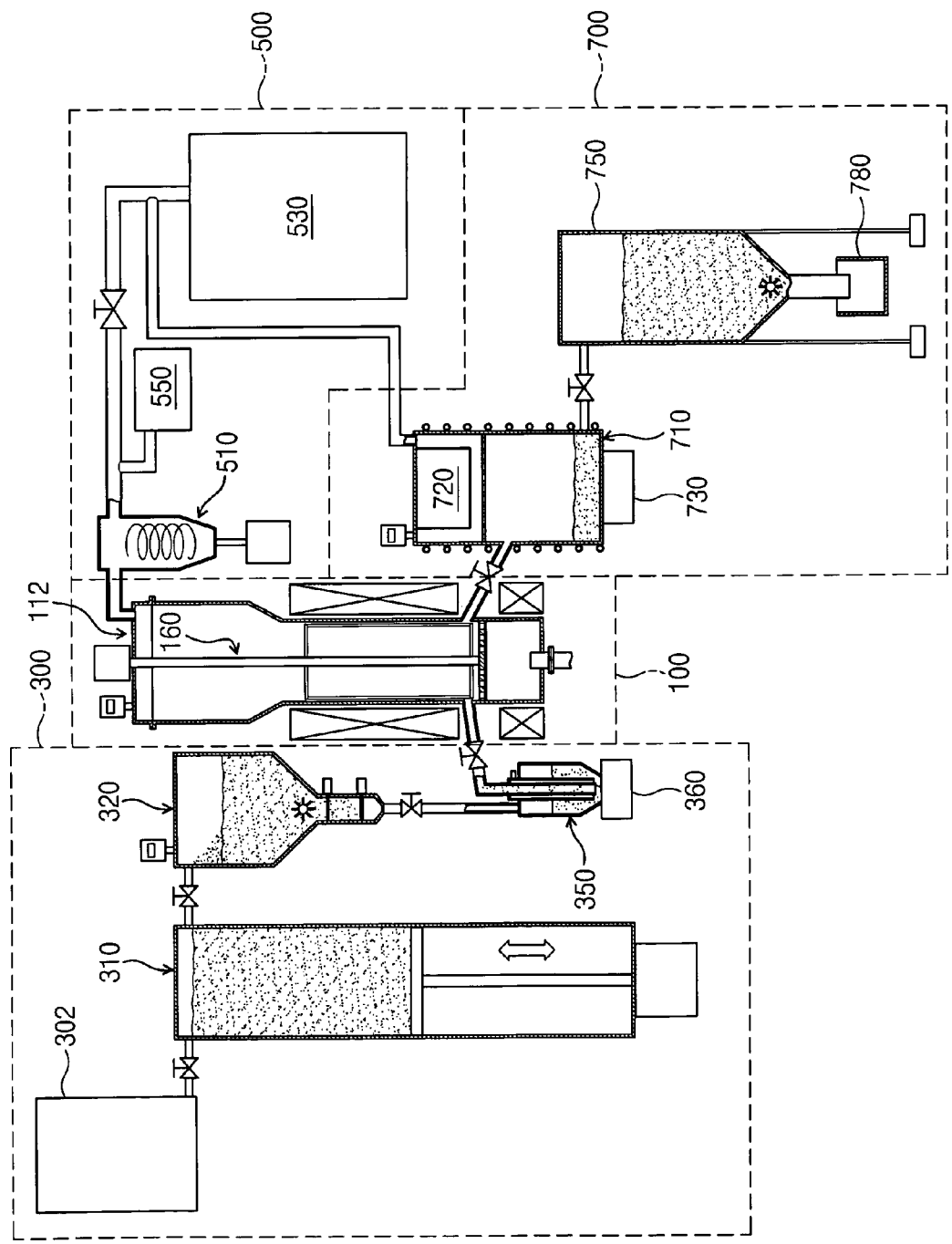
FIG. 1 is a schematic view of an exemplary carbon nanotube mass-production facility according to the present invention.

FIG. 1 is a schematic view of an exemplary carbon nanotube mass-production facility according to the present invention.

Referring to FIG. 1, a facility 1 can largely be divided into a fluid synthesizing apparatus 100, a catalyst supply unit 300, an exhaust unit 500, and a recovery unit 700. The fluid synthesizing apparatus 100 circulates catalysts and a source gas together to produce carbon nanotubes on the catalysts. The catalyst supply unit 300 supplies catalysts to the fluid synthesizing apparatus 100. The exhaust unit 500 exhausts source gas or catalysts that have not reacted in the fluid synthesizing apparatus 100. The recovery unit 700 recovers catalysts on which carbon nanotubes are produced from the fluid synthesizing apparatus 100. Detailed descriptions of the respective elements will be provided below.

Fluid Synthesizing Apparatus

Figure 2:
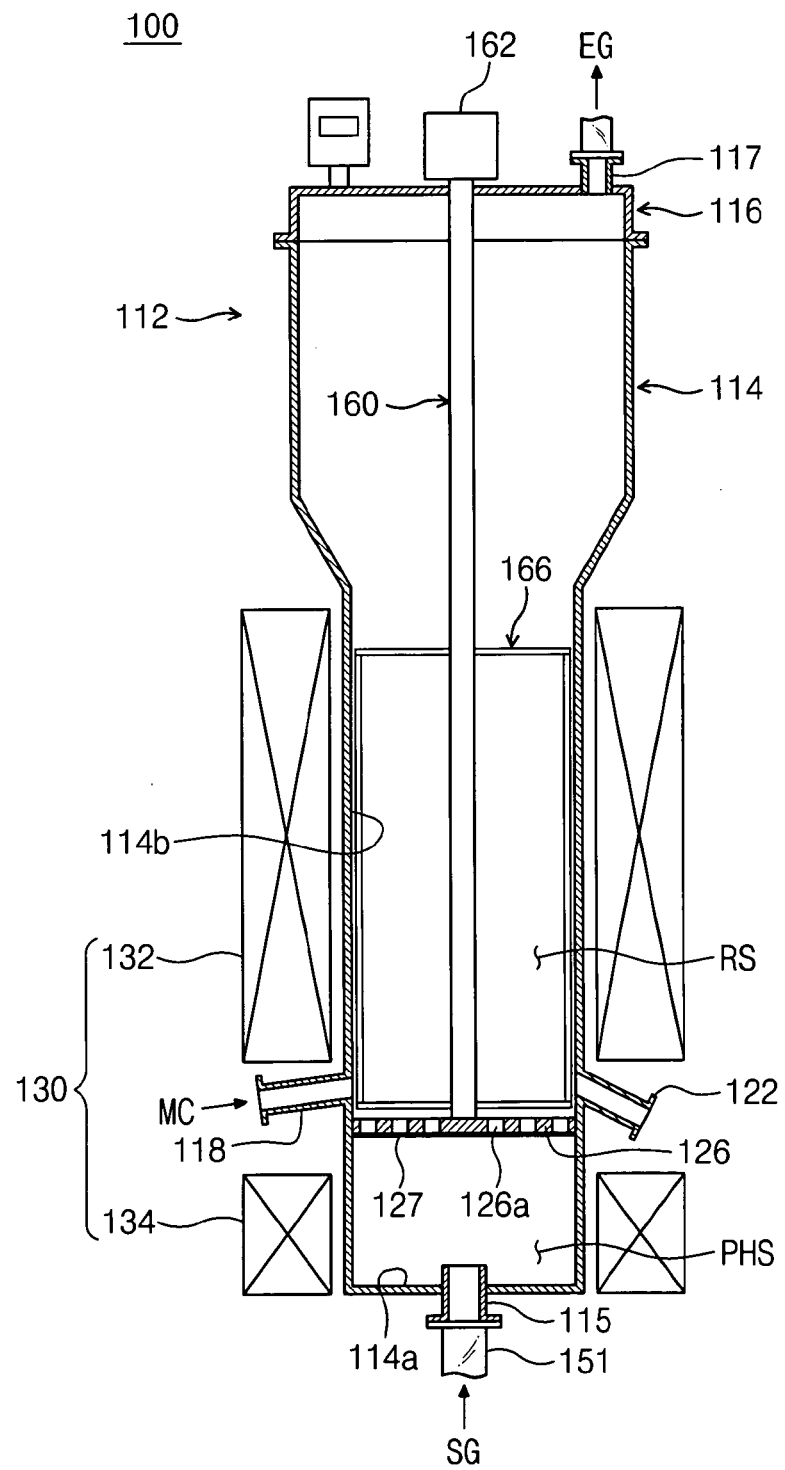
FIG. 2 is a diagram of the fluid synthesizing apparatus in FIG. 1.

FIG. 2 is a diagram of the fluid synthesizing apparatus 100 in FIG. 1.

Referring to FIG. 2, the fluid synthesizing apparatus 100 receives a supply of a gaseous fluid containing carbon (source gas) and metal catalysts into a reaction chamber 112, and performs thermal decomposition of the source gas to produce carbon nanotubes in a gaseous state. The fluid synthesizing apparatus 100 includes the reaction chamber 112, a heater 130, and a rotating member 160.

Reaction Chamber

The reaction chamber 112 is manufactured of a material with high heat tolerance, such as quartz or graphite. The reaction chamber 112 includes a gas supply port 115, a catalyst supply port 118, a recovery port 122, and a dispersion plate 126.

The reaction chamber 112 has a body 114 and a cover 116. The body 114 is cylindrical with an open top, and provides a preheating space (PHS) and a reaction space (RS). Here, the PHS is a space that preheats a source gas (SG) before it enters the RS. The RS is disposed above the PHS, and is a space in which SG and metal catalysts (MC) react to produce carbon nanotubes (CNT).

The body 114 includes a floor 114a and a sidewall 114b extending from the floor 114a to define the PHS and the RS. The floor 114a provides the PHS together with the sidewall 114b. The gas supply port 115, through which the SG is supplied, is connected to the floor 114a. While the body 114 in the present embodiment is provided with one gas supply port 115, the number of gas supply ports 115 may be increased in accordance with the types of gases supplied and the number of gas supply lines.

The sidewall 114b of the body 114 may be formed of a material such as quartz or graphite with high heat tolerance when provided as a single tube, but may further include an outer wall of a metal (such as stainless steel) with high heat and pressure tolerance when the sidewall is a double tube.

The MC may react with the wall during the process of thermally decomposing the SG to produce CNT. However, this limitation may be obviated by a rotating member, and a detailed description of the rotating member 160 will be provided below.

The cover 116 is disposed above the body 114. The cover 116 is coupled to open top of the body 114 to seal the body 114 from the outside. The exhaust port 117, for exhausting exhaust gas (EG) generated during the process of forming CNT, is coupled to the central portion of the cover 116. The exhaust port 117 is connected to the exhaust unit 500.

The catalyst supply port 118 is coupled to the sidewall of the body 114 and supplies MC to the body 114. The catalyst supply port 118 receives MC from the catalyst supply unit 300. The outlet of the catalyst supply port 118 may pass through the sidewall 114b of the body 114 and disposed within the RS.

The gas supply port 115, connected to a source gas line 151, is connected to a lower portion of the body 114. The fluid synthesizing apparatus 100 in the present embodiment includes one gas supply port, but the number of gas supply ports may be increased according to the size of the reaction chamber 112.

The source gas line 151 is connected to the gas supply port 115 of the body 114. Here, hydrocarbon-based gas—for example, acetylene, ethylene, methane, and hydrogen gas—may be used as an SG. The SG enters the PHS from the source gas line 151 through the gas supply port 115. The SG may further include a circulation gas. The circulation gas not only functions to prevent gravitational descent of CNT grown through reaction of hydrocarbon-based gas and MC due to the weight of the CNT, but also functions to promote reaction between hydrocarbon-based gas (hydrocarbon gas, for example) and MC by expanding the circulation region within the reaction chamber 112. Inactive gas such as helium, nitrogen, or argon may be used as the circulation gas, or gas such as methane, acetylene, carbon monoxide, carbon dioxide, or a mixture of such gas with argon gas may be used as required. While not illustrated, an inactive gas supply line may be connected to the floor 114a of the body 114 to fill the inside of the reaction chamber 112 after processing has been completed.

The dispersion plate 126 is provided at the bordering portion of the reaction space RS and the preheating space PHS. That is, the RS and PHS are partitioned by the dispersion plate 126. The dispersion plate 126 faces the floor 114a of the body 114, and is disposed below the catalyst supply port 118. A plurality of diffusion holes 126a is defined in the dispersion plate 126 to uniformly disperse SG to the RS. The SG enters the PHS from the source gas line 151, and the SG that enters the PHS is dispersed through the diffusion holes 126a into the RS. Because the dispersion plate 126 is affected little by the upper heater 132 and the lower heater 134, it maintains a temperature lower than the PHS or the RS, of about 400° C. or less. A mesh 127 is installed on the undersurface of the dispersion plate 126 to prevent metal catalysts falling into the PHS through the diffusion holes 126a of the dispersion plate 126.

The MC that flows to the upper portion of the dispersion plate 126 is suspended by the SG in the RS, and reacts with the SG. Accordingly, CNT are grown on the MC. Because the CNT is produced while the MC is suspended in the RS, growth of CNT becomes more active when the suspension of the MC is made more active.

The CNT grown on the MC in the RS are discharged through the recovery port 122 to the outside. Specifically, the recovery port 122 is connected to the sidewall 114b of the body 114 at a position close to the dispersion plate 126, and an entrance for suctioning CNT is provided in the RS. The recovery port 122 is connected to a recovery line 711 of the recovery unit 700, and the MC on which the CNT are grown are recovered by the recovery unit 700 by means of negative pressure gas flow.

Heater

The heater 130 has an upper heater 132 and a lower heater 134. The upper heater 132 is provided above the dispersion plate 126, and the lower heater 134 is provided below the dispersion plate 126. The upper heater 132 and the lower heater 134 are disposed proximate to the sidewall 114b of the body 114. The upper heater 132 heats mostly the RS, and the lower heater 134 heats mostly the PHS. The lower heater 134 is provided to enclose the PHS to increase the temperature of the PHS to a suitable temperature. Accordingly, the SG that enters the PHS is heated. The upper heater 132 is provided to enclose the RS to maintain the temperature of the RS to one suitable for activating growth of CNT, ranging from about 600° C. to about 900° C.

Because the upper heater 132 and the lower heater 134 do not directly radiate heat to a region corresponding to the dispersion plate 126, the dispersion plate 126 receives little thermal influence from the upper heater 132 and the lower heater 134. Accordingly, the temperature of the dispersion plate 126 is lower in temperature than the PHS or the RS, and may be maintained at about 400° C. or less. By thus maintaining the dispersion plate 126 disposed between the heaters 132 and 134 at a low temperature (about 400° C. or less), conglomerating of MC on the dispersion plate 126 can be prevented.

Rotating Members

First Embodiment of Rotating Member

Figure 3A:
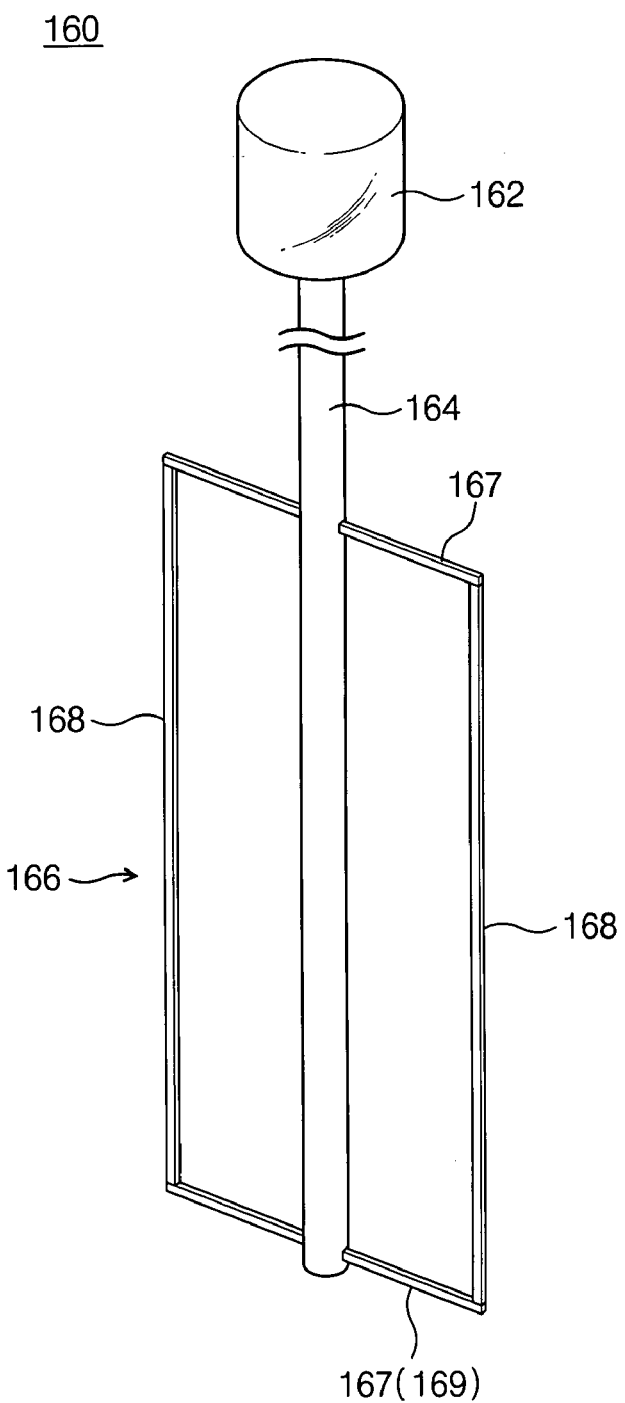
FIGS. 3A through 3C are diagrams of rotating members according to a first embodiment.
Figure 3B:
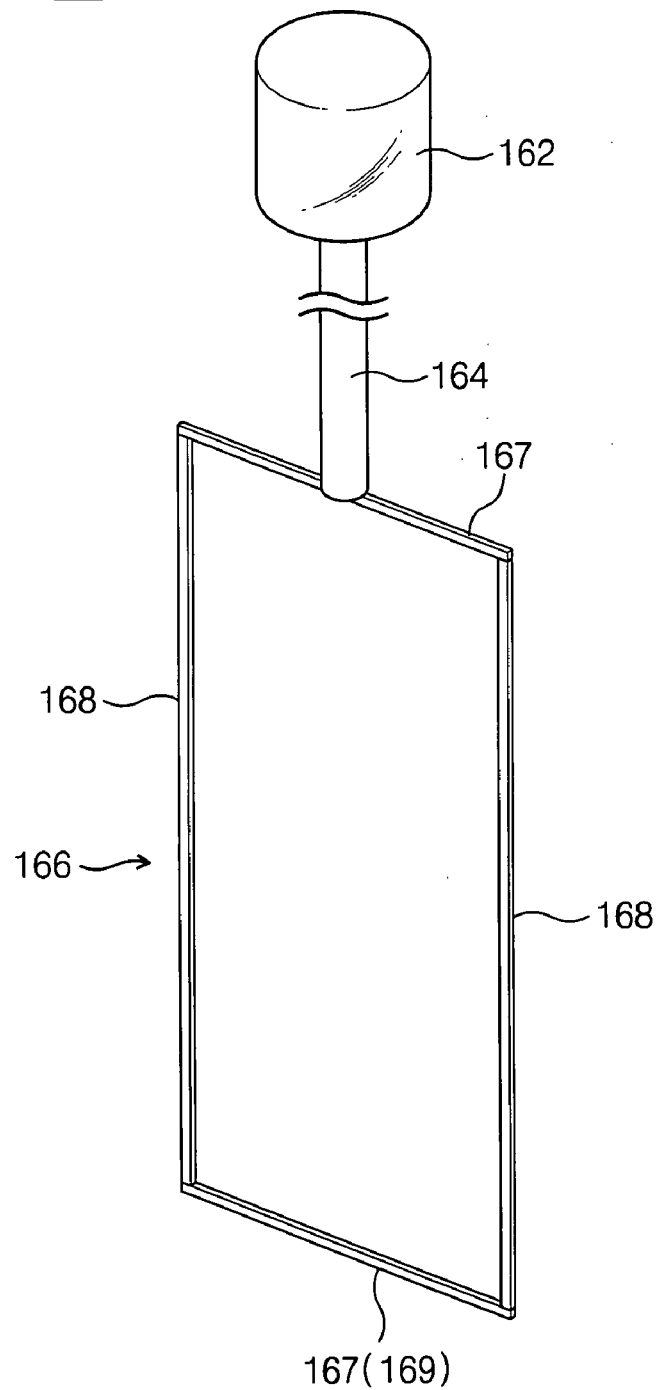
Figure 3C:
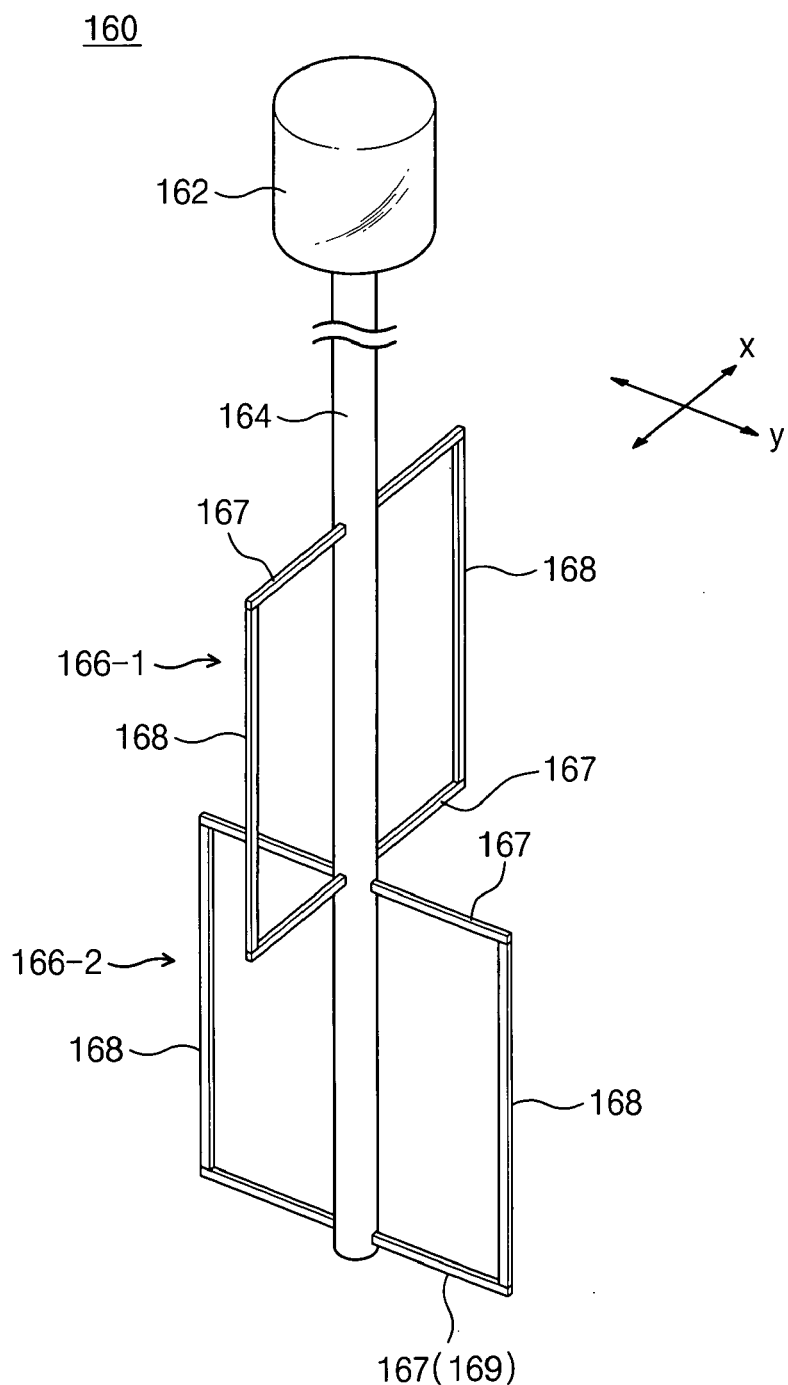

FIGS. 3A through 3C are diagrams of rotating members according to a first embodiment.

Referring to FIGS. 3A through 3C, the rotating member 160 increases flow of MC in the RS to prevent the MC from adhering to the sidewall 114b of the reaction chamber 112. The rotating member 160 includes a driver 162, a rotating shaft 164, and a rotating frame 166. The driver 162 is installed outside the reaction chamber 112. A motor may be used as the driver 162. The rotating shaft 164 is disposed within the RS, and receives rotating force from the driver 162. A rotating frame 166 is coupled to the rotating shaft 164. The rotating member 160 may operate electrically or non-electrically. When the rotating member 160 may be rotated at a slow speed (about 1 to 10 rpm) when used to prevent adhering of metal catalysts on the sidewall of the reaction chamber, and may be rotated at a speed faster than the slow speed when used for increasing a flow level in the reaction space.

The rotating frame 166 has blades 168 that rotate along the periphery of the RS. The blades 168 of the rotating frame 166 rotate along the periphery of the RS and physically remove metal catalysts adhered to the sidewall 114b of the reaction chamber 112. The blades 168 are fixed at either end by a support 167, and the supports 167 are connected and fixed to the rotating shaft 164 horizontally. The lengths of the supports 167 are similar to the radius of the reaction chamber 112, and the blades 168 are disposed at the tips of the supports 167. Accordingly, the blades 168 are disposed proximate to the inner wall of the reaction chamber 112. When viewed from the front, the rotating frame 166 is formed as a rectangular frame with the center open. For reliable rotation of the rotating frame 166, the lower end of the rotating shaft 164 may be rotatably supported by the dispersion plate 126.

Referring to FIG. 3a, the rotating shaft 164 is provided extending vertically in the reaction space. One end of the rotating shaft 164 may extend to a position proximate to the dispersion plate 126. The rotating shaft 164 is formed to perpendicularly through the center of the rotating frame 166, to reliably rotate the rotating frame 166.

Selectively, as illustrated in FIG. 3b, an end of the rotating shaft 164 may extend up to the upper end of the rotating frame 166, and the rotating frame 166 may be connected to the end of the rotating shaft 164. This may minimize the rotating shaft 164 interfering with flow of metal catalysts.

The rotating member 160 illustrated in FIG. 3c is provided with a first rotating frame 166-1 and a second rotating frame 166-2, where the first rotating frame 166-1 and the second rotating frame 166-2 are installed in succession on the rotating shaft 164. Here, the first rotating frame 166-1 and the second rotating frame 166-2 are installed disposed in different directions on the rotating shaft 164. For example, the first rotating frame 166-1 and the second rotating frame 166-2 may be installed to be perpendicular to each other. The first rotating frame 166-1 is installed along an x-axis, and the second rotating frame 166-2 is installed along a y-axis.

As such, because the rotating member 160 in the RS of the reaction chamber 112 are rotated electrically or non-electrically, MC adhering to the sidewall of the reaction chamber can be prevented to raise product yield and manufacturability.

Second Embodiment of Rotating Member

Figure 4A:
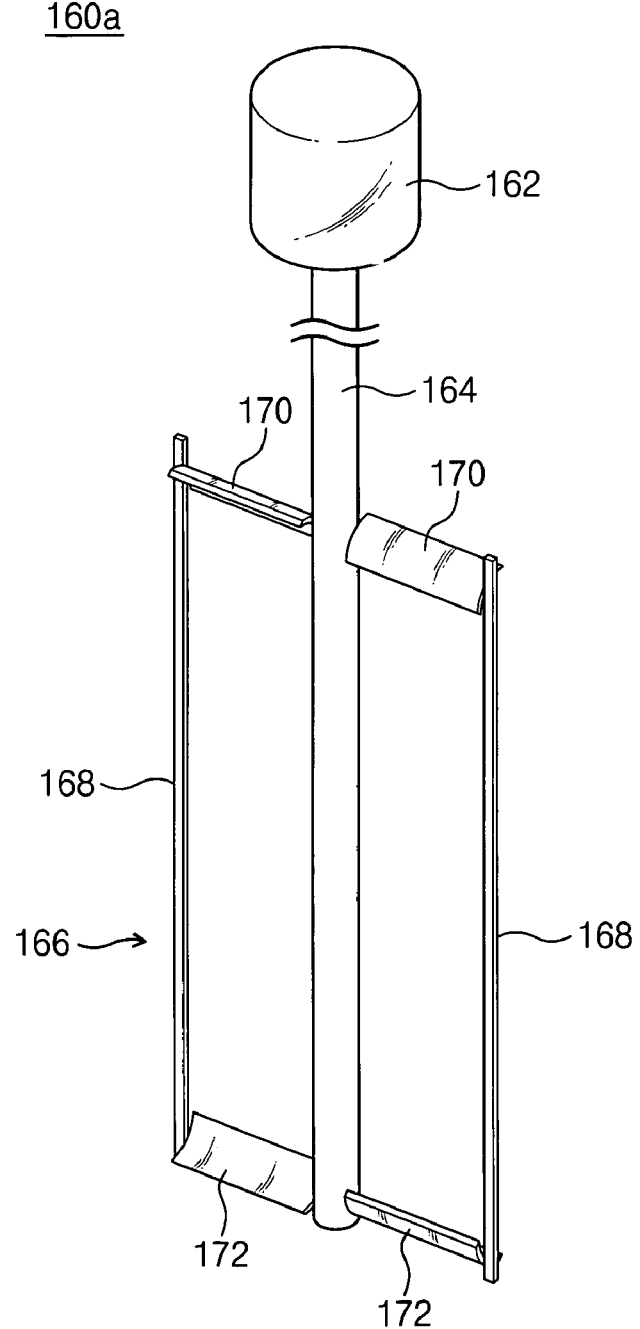
FIGS. 4A and 4B are perspective views of rotating members according to a second embodiment.
Figure 4B:
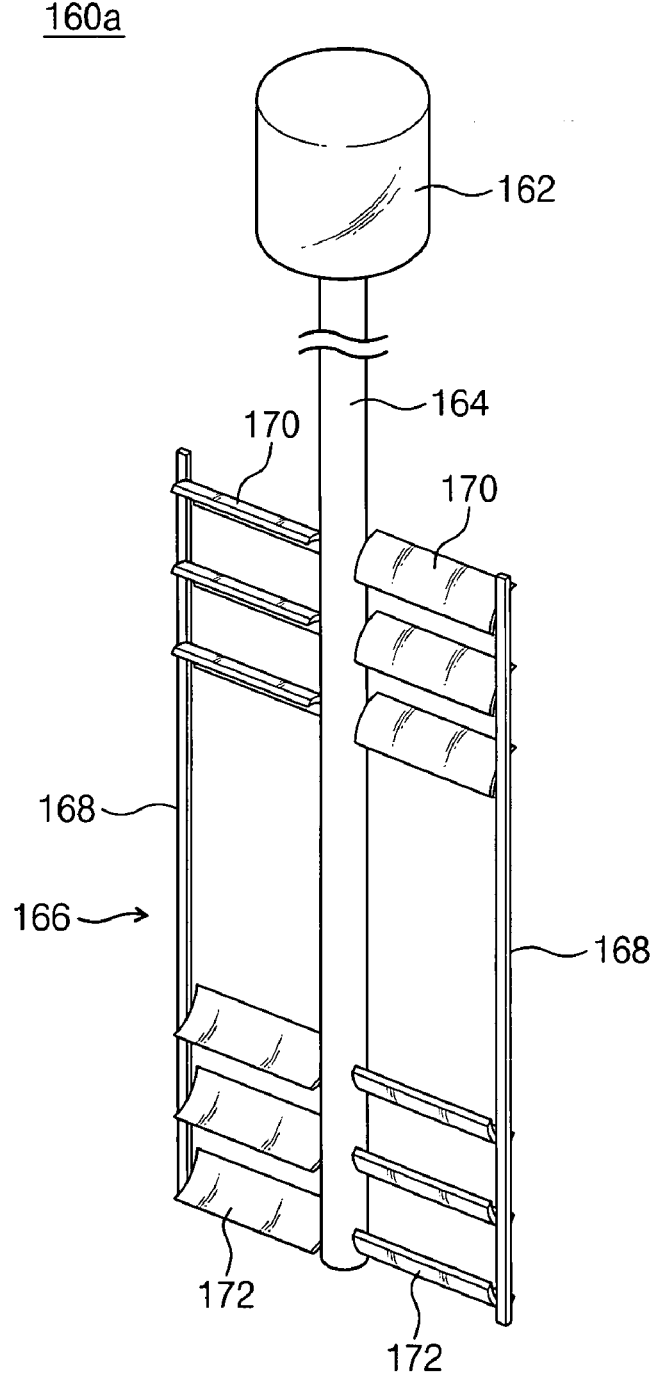
Figure 5:
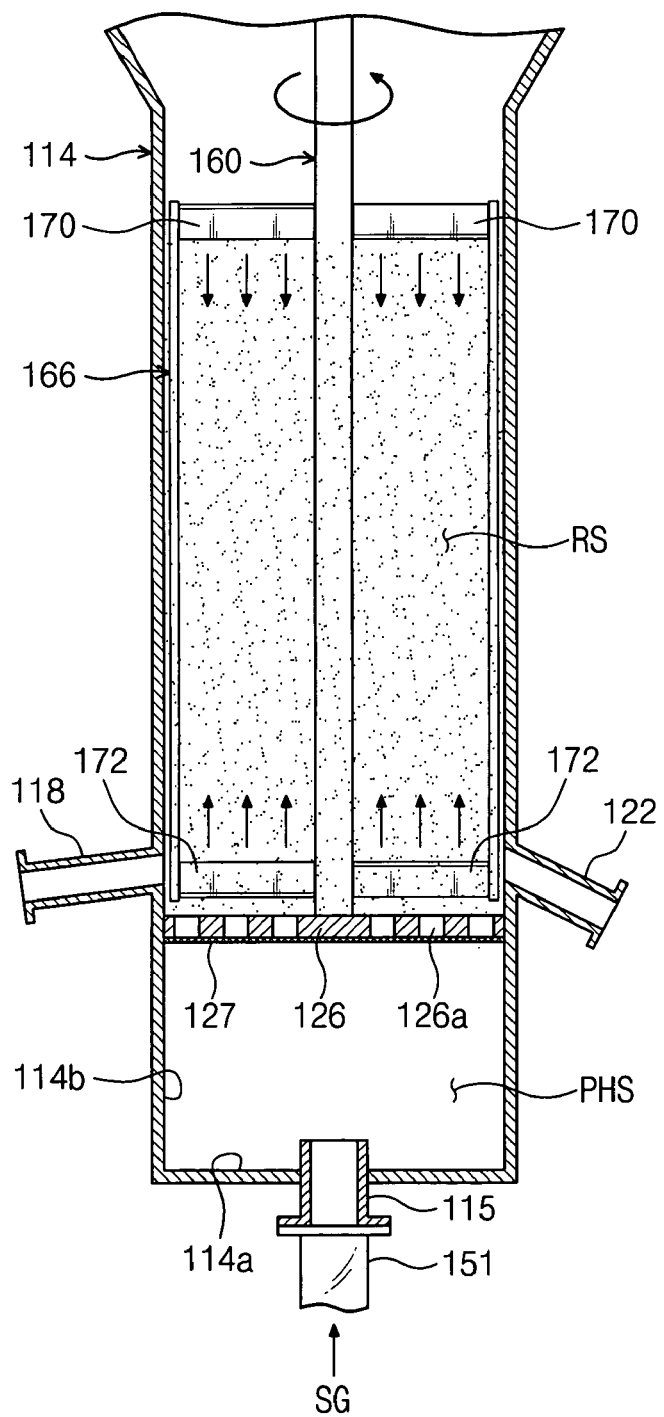
FIG. 5 is a diagram illustrating a reaction space in use, in which a downward flow and an upward flow are generated by the rotating member in FIG. 4A.

FIGS. 4A and 4B are perspective views of rotating members according to a second embodiment. FIG. 5 is a diagram illustrating a reaction space in use, in which a downward flow and an upward flow are generated by the rotating member in FIG. 4A.

Referring to FIGS. 4A and 4B, a rotating member 160a includes a driver 162, a rotating shaft 164, and a rotating frame 166 that have the same structures and functions as in the first embodiment. Because these elements have already been described in the description of the rotating member 160 in the first embodiment, description thereof will be omitted from the present embodiment. A difference of the second embodiment lies in that the rotating frame 166 has downward wings 170 and upward wings 172 to provide downward current and upward current in the RS.

The downward wings 170 prevent small metal catalyst particles from rising to the upper portion of the RS. The upward wings 172 prevent large metal catalyst particles from settling to the lower portion of the RS. The downward wings 170 and the upward wings 172 may be replacements for the supports, or may modifications of the supports into wing shapes. Selectively, the downward wings 170 and the upward wings 172 may be mounted on the supports. One downward wing 170 with a concave lower surface may be disposed on either side. One upper wing 172 with a concave upper surface may be disposed on either side. In particular, when viewed from the side, the downward wings 170 and the upward wings 172 are offset from one another.

Referring to FIG. 5, when the rotating frame 166 rotates, the downward wings 170 disposed at the upper portion generate a downward current toward the lower portion of the RS. This downward current minimizes loss of small metal catalyst particles to the upper portion of the RS. Also, when the rotating frame 166 rotates, the upward wings 172 disposed at the lower portion generate an upward current toward the upper portion of the RS. Of course, while being capable of obtaining flow of metal catalysts through source gas supplied through the dispersion plate 126, in addition, the upward current generated by the upward wings 172 suspends large metal catalyst particles that would otherwise tend to settle on the dispersion plate 126.

For example, if the supplied pressure of the source gas is raised to promote flow of large metal catalyst particles, small metal catalyst particles may be escape from the RS and be exhausted together with exhaust gas through the exhaust port. However, when the upward wings 172 are installed on the rotating frame 166, large metal catalyst particles can be suspended without raising the supplied pressure of the source gas.

When the degree of suspension of metal catalysts in the RS is controlled by the pressure of SG, the pressure of the SG is determined according to the size of the MC particles. Typically, the size of MC particles ranges between about 0.6 μm and 300 μm, which is a relatively wide distribution of particles. Therefore, pressure of SG is based on the median of MC particle size. Accordingly, smaller metal catalyst particles can be exhausted through the exhaust port 117 by means of the SG pressure. Also, larger metal catalyst particles can accumulate on the upper portion of the dispersion plate 126. Such limitations can be minimized with the downward wings 170 and the upward wings 172 of the rotating member 160, and these wings can provide more effective forced flow (circulation) within the reaction chamber 112. Thus, by not supplying source gas at an excessively high pressure to suspend larger metal catalysts, waste of source gas can be reduced.

Referring again to FIG. 3a, the rotating frame 166 of the rotating member 160 may include floor blades 169 that rotate above the dispersion plate 126. The floor blades 169 are disposed proximately to the dispersion plate 126 to sweep metal catalysts accumulated on the dispersion plate 126 (the larger metal catalyst particles described above) to prevent the occurrence of channeling from accumulation of metal catalysts on the dispersion plate 126. The floor blades 169 may be additionally installed as separate components to the rotating frame 166. However, as illustrated in FIG. 3a, because the support 167 installed at the lower end of the rotating frame 166 performs the function of the floor blades 169, there is no need to additionally install separate floor blades.

While the blades in the present embodiment are depicted as being fixedly installed on the upward wings 172 and the downward wings 170, if the lengths (size) of the wings are small, the blades may be installed on the supports. As illustrated in FIG. 4b, the downward wings 170 and the upward wings 172 may be installed in three rows at the upper end and the lower end of the rotating frame 166, respectively, and the numbers of the wings may be increased or reduced as required.

Figure 6A:
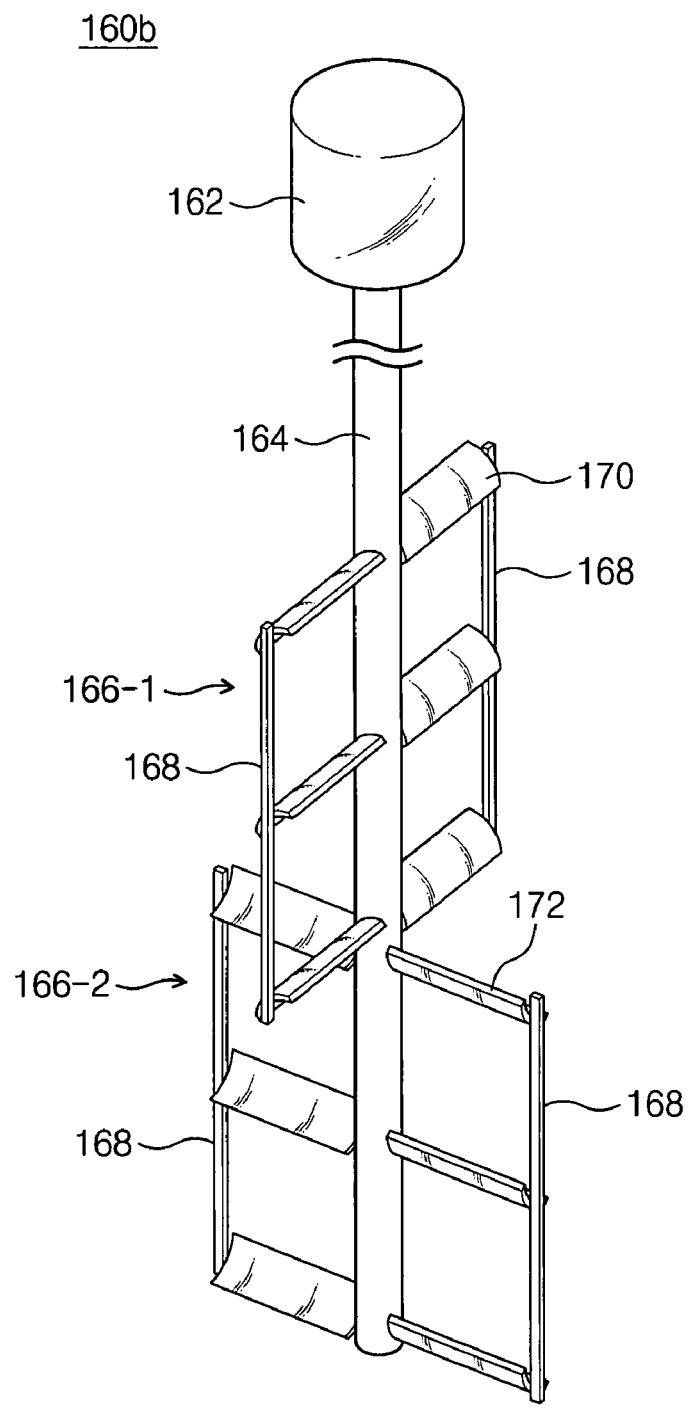
FIGS. 6A and 6B are diagrams illustrating the rotating member in FIG. 3C according to modified embodiments on which the upward blades and downward blades are provided.
Figure 6B:
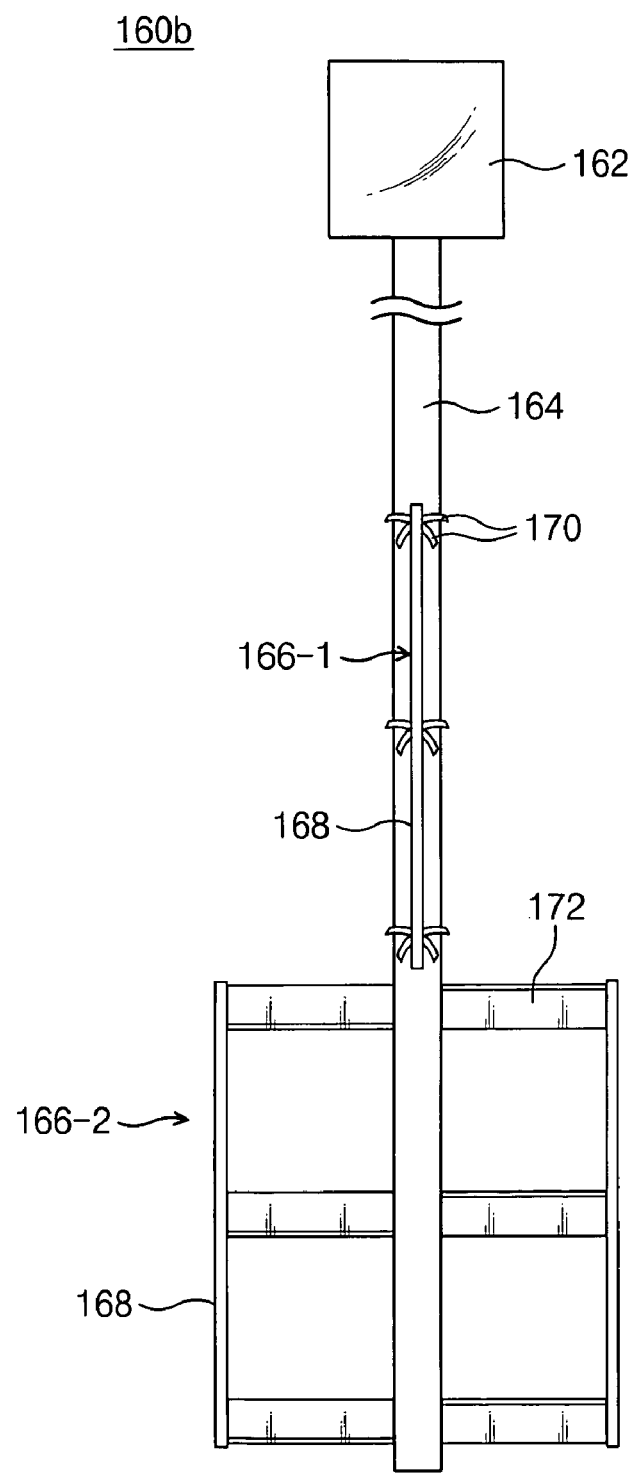

FIGS. 6A and 6B are diagrams illustrating the rotating member in FIG. 3C according to modified embodiments on which the upward wings and downward wings are provided.

Referring to FIGS. 6A and 6B, a rotating member 160b is provided with a first rotating frame 166-1 and a second rotating frame 166-2, where the first rotating frame 166-1 and the second rotating frame 166-2 are successively installed on the rotating shaft 164. Here, the first rotating frame 166-1 is installed in an X-axis direction, and the second rotating frame 166-2 is installed in a Y-axis direction. The downward wings 170 are installed in a three-level configuration on the first rotating frame 166-1, and the upward wings 172 are installed in a three-level configuration on the second rotating frame 166-2. The thus-configured rotating member 160b performs the same functions as those described above.

Catalyst Supply Unit

Referring again to FIG. 1, the catalyst supply unit 300 includes a catalyst producing device 302, a first storage device 310, a supplying device 320, and an input device 350.

Metal catalysts are produced in the catalyst producing device 302. The metal catalysts produced in the catalyst producing device 302 are stored in the first storage device 310. The metal catalysts stored in the first storage device 310 are supplied to the supplying device 320 when required.

First Storage Device

Figure 7:
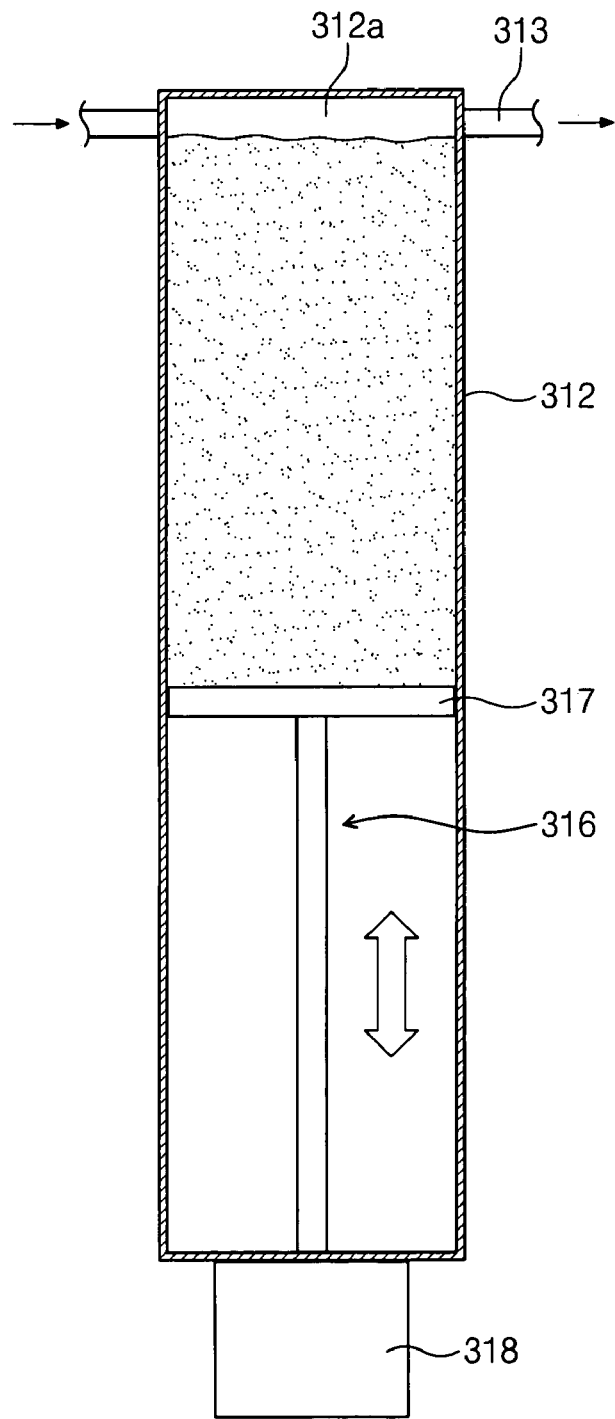
FIG. 7 is a sectional view of the first storage device in FIG. 1.

FIG. 7 is a sectional view of the first storage device in FIG. 1.

The first storage device 310 includes a first storage tank 312 and a pushing device 316. The first storage tank 312 has a compartment 312a that stores metal catalysts that can be used several tens of times by the fluid synthesizing apparatus 100, and a passage 313 connected to the supplying device 320. The passage 313 is provided at the top portion of the first storage tank 312. The pushing device 316 is for pushing the metal catalysts stored in the first storage tank 312 into the passage 313. The pushing device 316 includes a pressing plate 317 installed within the first storage tank 312 to be capable of moving vertically, and an elevating driver 318 for elevating the pressing plate 317. As a means for elevating the pressing plate 317, the elevating driver 318 may employ a linear driving mechanism such as a hydraulic/pneumatic cylinder-driven mechanism and a motor and ball-screw mechanism, which are well-known driving mechanisms in the art, so that a detailed description thereof will not be provided. When the metal catalysts stored in the supplying device 320 fall below a predetermined level, a quantity detection sensor (not shown) installed in the supplying device 320 detects this condition and provides a detection signal to the pushing device 316. The pushing device 316 elevates the pressing plate 317 according to the signal (a signal providing notification that the quantity of metal catalysts has fallen below a predetermined level) received from the quantity detection sensor, to supply a portion of the metal catalysts stored in the first storage tank 312 to the supplying device 320 through the passage 313.

Supplying Device

Figure 8:
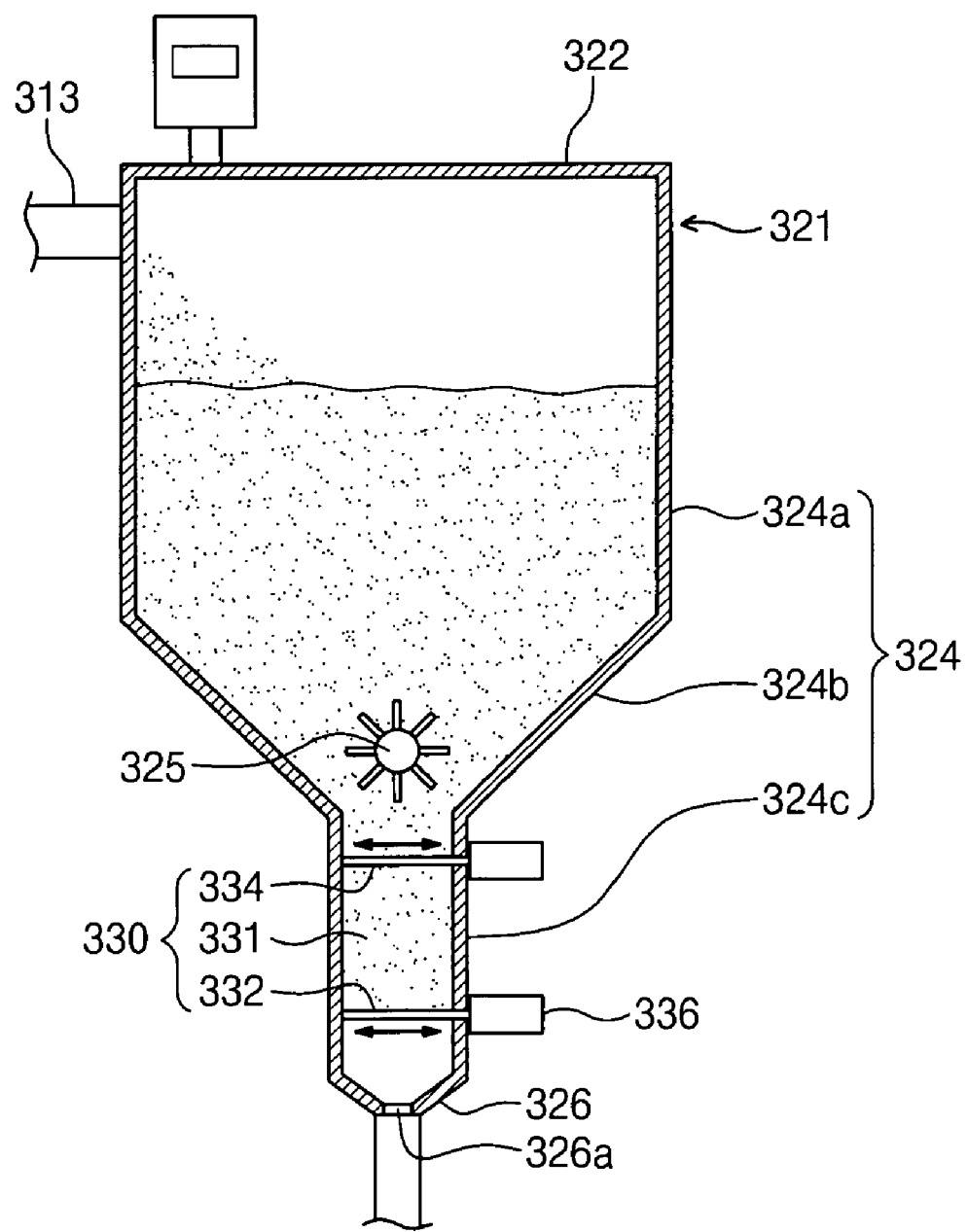
FIG. 8 is a sectional view of the supplying device in FIG. 1.

FIG. 8 is a sectional view of the supplying device in FIG. 1.

The supplying device 320 has a second storage tank 321 that stores a quantity of metal catalysts that can be used several times in the fluid synthesizing apparatus 100. The second storage tank 321 includes an upper surface 322, a side surface 324, and a lower surface 326 defining a discharge port 326a. The side surface 324 includes a substantially vertical upper section 324a, a midsection 324b sloping progressively inward while extending downward from the upper section 324a, and a lower section 324c extending downward in a substantially vertical direction from the midsection 324b to provide a narrow passage. In the above-described structure, a greater quantity of metal catalysts (MC) can be stored in a space provided by the upper section 324a than in a space provided by the lower section 324c, given that the respective spaces have the same height. The above-described shape of the midsection 324b enables the MC within the space provided by the upper section 324a to easily be supplied to the space provided by the lower section 324c.

A set quantity supplying part 330, for supplying a set quantity of metal catalysts to be used once by the fluid synthesizing apparatus 100, is installed in the second storage tank 321.

The set quantity supplying part 330 includes an upper closing plate 334 and a lower closing plate 332 that define a set quantity space 331 in which a set amount of MC can be filled. The upper closing plate 334 and the lower closing plate are provided in the lower section 324c. The set quantity space 331 is disposed above the discharge port 326a of the second storage tank 321, the upper closing plate 334 is provided at the top of the set quantity space 331, and the lower closing plate 332 is provided at the bottom of the set quantity space 331. The upper closing plate 334 and the lower closing plate 332 are operated to open and close by a driving member 336 such as a cylinder. When the upper closing plate 334 is closed with the lower closing plate 332 closed, metal catalysts of a set quantity fill the set quantity space 331 between the lower closing plate 332 and the upper closing plate 334.

When the lower closing plate 332 is opened, the MC filled in the set quantity space 331 is supplied to the input device 350 through the discharge port 326a. An agitator 325 for agitating MC is installed in the midsection 324b of the second storage tank 321. The agitator 325 rotates to perform the functions of removing voids within the second storage tank 321 before the metal catalysts are supplied to the set quantity space 332 and of induce natural descending and supplying of the MC to the set quantity space 331.

Input Device

Figure 9:
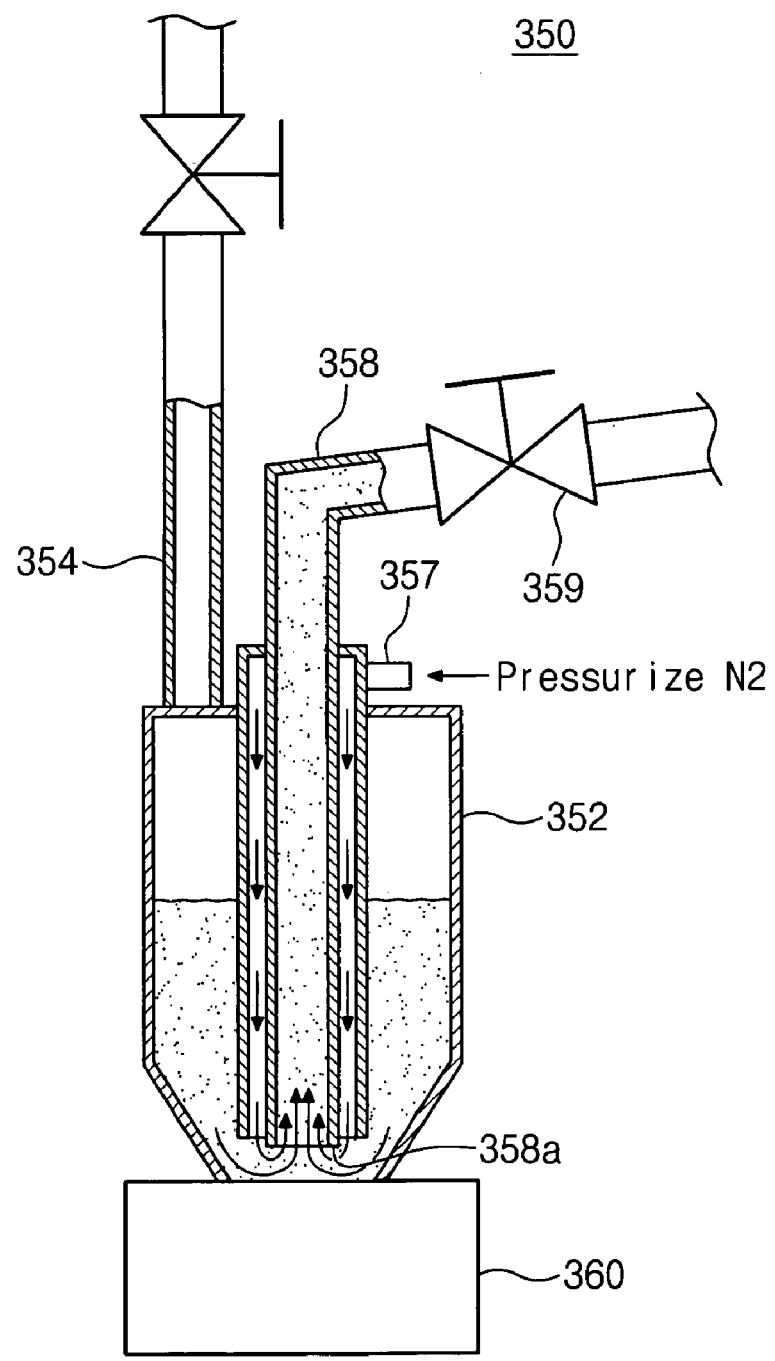
FIG. 9 is a sectional view of the input device in FIG. 1.

FIG. 9 is a sectional view of the input device in FIG. 1.

The input device 350 includes an input tank 352, an input discharge pipe 358 through which metal catalysts are supplied from the input tank 352 to the reaction chamber 112, and an inactive gas supply pipe 357 for pressurizing the inner space of the input tank 352. The inlet 358a of the input discharge pipe 358 is disposed apart from the floor of the input tank 352. Also, the inactive gas supply pipe 357 is configured as a double pipe enclosing the input discharge pipe 358. The input tank 352 includes an entrance port 354 through which metal catalysts are supplied from the supplying device 320 above. The input device 350 supplies metal catalysts filled in the input tank 352 to the reaction chamber 112 through the input discharge pipe 358, using pressurization of inactive gas provided from the inactive gas supply pipe 357 and a slight negative pressure inside the reaction chamber 112. When an opening/closing valve 359 installed on the input discharge pipe 358 is opened, metal catalysts in the input tank 352 are induced into the reaction chamber 112 together with inactive gas through the input discharge pipe 358, by means of a pressure difference between the reaction chamber 112 and the input tank 352. An oscillator 360, for applying vibrations to the input tank 352 to facilitate induction of metal catalysts into the input discharge pipe 358, is installed on the input tank 352. While not shown, inactive gas supplied to the input tank 352 is supplied together with metal catalysts to the input discharge pipe 358.

Exhaust Unit

Figure 10:
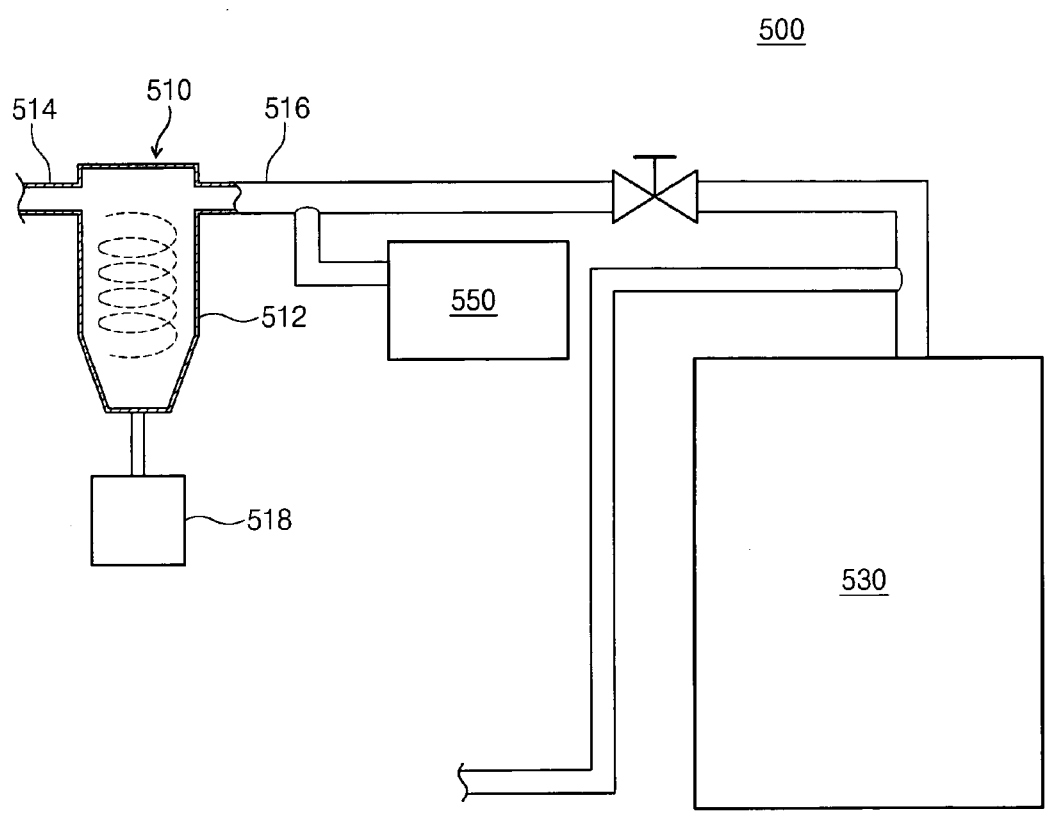
FIG. 10 is a diagram of the exhaust unit in FIG. 1.

FIG. 10 is a diagram of the exhaust unit in FIG. 1.

The exhaust unit 500 is a portion that exhausts and processes gas that does not react during the process of producing carbon nanotubes from the fluid synthesizing apparatus 100 and remaining gas (exhaust gas) after reaction. The exhaust unit 500 includes a cyclone 510, a scrubber 530, and a residual gas detector 550.

The cyclone 510 is for separating metal catalysts from exhaust gas that includes metal catalysts. The cyclone 510 includes a cylindrical cyclone body 512, an intake pipe 514 for admitting exhaust gas including metal catalysts into the cyclone body 512, an exhaust pipe 516 for exhausting only separated gas after the admitted exhaust gas and metal catalysts are separated from one another, and a collection chamber 518 for collecting metal catalysts that are separated from exhaust gas and discharged. The metal catalysts collected by the collection chamber 518 may be re-used by the fluid synthesizing apparatus 100.

The scrubber 530 removes and filters exhaust gas that has passed through the cyclone 510. A residual gas detector 550 is installed on the exhaust pipe 516 to connect the cyclone 510 and the scrubber 530. The residual gas detector 550, as a gas chromatography (GC) device, performs residual gas analysis (RGA).

The residual gas detector 550 is for detecting whether there is source gas (especially hydrogen gas) remaining in the exhaust gas, and for determining the point for recovering carbon nanotubes from the reaction chamber 112. Because negative pressure is continuously applied to the residual gas detector 550 to suction gas, a valve (not shown) may be controlled to detect residual gas in the exhaust gas only in required stages. Recovery of carbon nanotubes from the fluid synthesizing apparatus 100 may be performed according to the concentration of residual gas detected by the residual gas detector 550. For example, when synthesizing of carbon nanotubes in the fluid synthesizing apparatus 100 is completed, purge gas (inactive gas) is supplied to form an inactive atmosphere within the reaction chamber 112, after which the recovery unit 700 recovers the carbon nanotubes. If the hydrogen concentration value in the residual gas is detected by the residual gas detector 550 to exceed a predetermined value, a closed state of a valve 711a installed in the recovery line 711 connecting the reaction chamber 112 and the recovery unit 700 of the fluid synthesizing apparatus is maintained. Conversely, if the hydrogen concentration value in the residual gas is detected by the residual gas detector 550 to be lower than a predetermined value (preferably, not detected at all), the valve 711a of the recovery line 711 is opened to perform the recovery process of carbon nanotubes.

Recovery Unit

Figure 11:
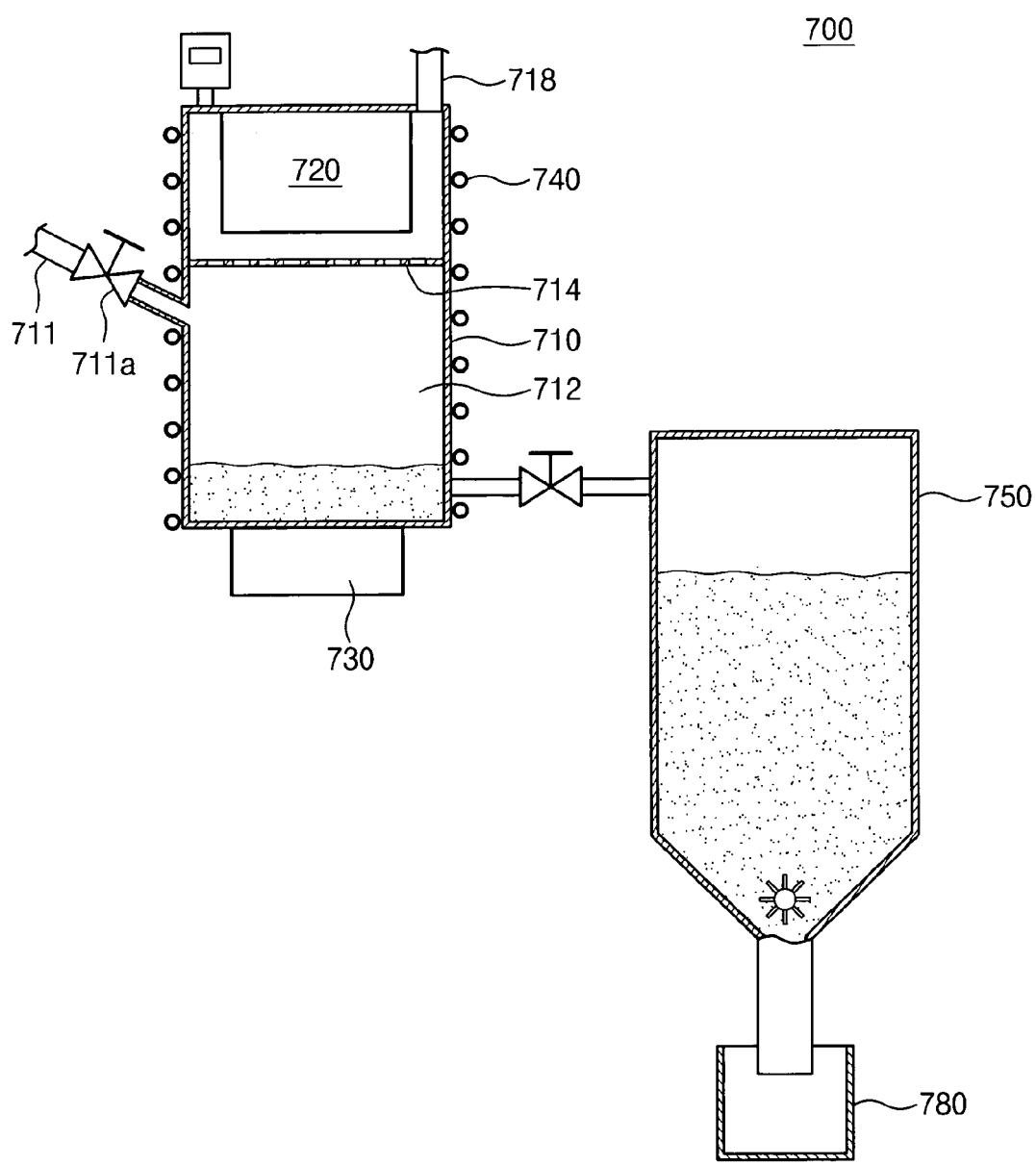
FIG. 11 is a sectional view of the recovery unit in FIG. 1.

FIG. 11 is a sectional view of the recovery unit in FIG. 1.

Referring to FIG. 11, the recovery unit 700 uses negative pressure to recover carbon nanotubes produced in the reaction chamber. The recovery unit 700 includes a recovery tank 710, a negative pressure generating member 720, an electromagnet 730, a cooling member 740, and a large capacity storage tank 750.

The recovery tank 710 has a recovery space 712 of a size capable of accommodating about 1 to about 3 recovery processes of carbon nanotubes produced in the reaction chamber. A negative pressure generating member 720 is installed in the upper portion of the recovery space 712, and a filter 714 is installed therebelow, for preventing carbon nanotubes recovered by the recovery space 712 from entering the negative pressure generating member 720 due to negative pressure. An exhaust pipe 718, connected to the scrubber 530 of the exhaust unit 500, is installed at the top of the recovery tank 710. Because there is a danger of an explosion if residual gas remains inside the reaction chamber during the recovery process of carbon nanotubes, the air exhausted from the recovery tank 710 is provided to the scrubber 530 of the exhaust unit 500.

The negative pressure generating member 720 forms an internal pressure (negative pressure) within the recovery space inside the recovery tank 710 that is lower than the pressure in the reaction chamber. A pump may be used as the negative pressure generating member 720. The greater the size of the recovery tank 710, the greater the capacity of the negative pressure generating member 720 must be, and in particular, the longer the size of the recovery tank 710, the longer it takes for negative pressure to be generated. Accordingly, the recovery tank 710 has a size capable of performing about 1 to about 3 carbon nanotube recoveries.

The recovery tank 710 is cooled by a cooling member 740. Carbon nanotubes produced in the reaction chamber are of high temperature. When carbon nanotubes of a high temperature (of 500° C. or higher) come into contact with oxygen, they oxidize and combust. To cool the recovery tank 710, its inside may be filled with an inactive gas, which consumes a large quantity of inactive gas. However, the cooling member 740 is used to quickly cool and maintain the carbon nanotubes at a temperature of about 400° C. or lower, to prevent the carbon nanotubes from oxidizing and combusting.

The electromagnet 730 is installed on the floor of the recovery tank 710. The electromagnet 730 is for preventing carbon nanotubes recovered in the recovery tank 710 from being blown around. To describe the recovery process of carbon nanotubes, when negative pressure is generated by the negative pressure generating member 720 in the recovery tank 710, carbon nanotubes that have been deposited are blown around and clog the filter. When the filter 714 is gradually blocked by carbon nanotubes, the negative pressure is gradually lowered so that recovery efficiency is decreased. However, when the electromagnet 730 is used, because carbon nanotubes recovered in the recovery tank 710 can be prevented from being blown around by magnetic force, blocking of the filter by carbon nanotubes can be reduced.

Carbon nanotubes recovered in the recovery tank 710 are transferred to the large-capacity tank 750. A transferring member 760 that performs transferal from the recovery tank 710 to the large-capacity storage tank 750 may employ a descension method, a pressurizing method, an electromagnetic method, etc. The carbon nanotubes stored in the large-capacity tank 750 are then packaged in predetermined quantities by a packing container 780, as required.

A brief description will be provided of a facility for mass-production of the above carbon nanotubes 30.

The heater 130 heats the reaction chamber 112 to increase and maintain the temperature in the reaction space (RS) to a required temperature (of about 600° C. or higher). Here, the temperature of the dispersion plate 126 is maintained lower than the temperature of the RS. The catalyst supply unit 300 supplies metal catalysts to the RS of the reaction chamber 112, and after a source gas is preheated in the preheating space (PHS), it is supplied to the RS through the dispersion plate 126. The metal catalysts are suspended in the RS by the source gas (SG) that passes through the diffusion holes 126a and react with the SG to produce carbon nanotubes (CNT).

In this process, the rotating member 160 rotates slowly to prevent metal catalysts from adhering to the sidewall 114b of the reaction chamber 112 and from accumulating on the dispersion plate 126. Also, the downward wings 170 of the rotating member 160 in the upper portion of the RS generate a downward current, and the upward wings 172 of the rotating member 160 in the lower portion of the RS generate an upward current. The downward current generated by the rotating member 160 can minimize the occurrence of small metal catalyst particles from escaping to the top of the RS, and the upward current aids in suspending large metal catalyst particles that have a tendency to settle on the dispersion plate 126. Therefore, the limitation of particle size-dependent failure of metal catalysts to circulate during circulation and reaction thereof can be minimized, and synthesizing yield can be increased. Further, the quantity of source gas that is used can be reduced to lower production costs.

While CNTs are being produced in the reaction chamber 112, exhaust gas (EG) generated in the RS is suctioned into the exhaust unit 500 through the exhaust port 117 at the top of the reaction chamber 112. While metal catalysts (of small particle size) are included in the EG supplied through the exhaust passage, the metal catalysts exhausted together with the EG are separated in the cyclone 510 and collected by the collection chamber to be reused later.

When production of CNTs is completed in the reaction chamber 112, the inside of the reaction chamber 112 is filled with inactive gas to remove the source gas, after which the metal catalysts on which the CNTs are grown are supplied through the recovery line 711 to the recovery unit 700. Using a negative pressure in the recovery unit 700, the metal catalysts on which the CNTs have been grown are recovered. Also, by lowering the temperature of the recovered metal catalysts (on which the CNTs have been grown) in the recovery unit 700, oxidizing and combustion of CNTs can be prevented. The above-described process is performed repeatedly.

According to the present invention, metal catalyst particles can be prevented from reaction-induced adhesion to an inner wall of a reaction chamber and reacting with the inner wall.

Also, the present invention can prevent the occurrence of channeling caused by accumulation of metal catalysts on a dispersion plate.

Also, the present invention can reduce the quantity of a source gas that is used.

Also, the present invention can supply a fixed quantity of a metal catalyst.

Also, the present invention can quickly recover metal catalysts on which carbon nanotubes are grown.

Also, the present invention can continuously produce carbon nanotubes.

Also, the present invention can prevent loss of metal catalysts.

Also, the present invention can increase productivity and reduce production costs of carbon nanotubes.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A fluidizing bed apparatus for producing carbon nanotubes, the fluidizing bed apparatus comprising:
   i) a reaction chamber comprising:
      a reaction space in which metal catalysts and a source gas react with one another to produce carbon nanotubes; and
      a dispersion plate that disperses source gas into the reaction space;
   ii) a rotating member increasing fluidizing of the metal catalysts in the reaction space comprising:
      a rotating frame rotating at edges of the reaction space;
      a floor blade disposed proximate to the dispersion plate to sweep metal catalysts accumulating on the dispersion plate;
      downward wings generating a downward current from an upper portion to a lower portion of the reaction space to prevent small metal catalyst particles escaping from the upper portion of the reaction space; and
      upward wings generating an upward current from the lower portion to the upper portion of the reaction space to prevent large metal catalyst particles from settling to the lower portion of the reaction space.

2. The fluidizing bed apparatus of claim 1, wherein the reaction chamber further comprises a mesh for preventing metal catalysts from falling through the dispersion plate into the preheating space.

3. The fluidizing bed apparatus of claim 1, further comprising:
   an upper heater installed outside the reaction space; and
   a lower heater installed outside the preheating space,
   wherein the upper heater is provided at an upper portion of the dispersion plate, and the lower heater is provided at a lower portion of the dispersion plate.

4. A facility for producing carbon nanotubes, comprising:
   i) a fluid synthesizing apparatus comprising
      a reaction chamber containing a reaction space in which metal catalysts and source gas react with one another to produce carbon nanotubes, and
      a rotating member for preventing metal catalysts from adhering to a sidewall of the reaction chamber;
   ii) a catalyst supply unit for supplying metal catalysts to the fluid synthesizing apparatus comprising:
      an input device for inputting metal catalysts in the reaction chamber,
      a supplying device for supplying metal catalysts to the input device, and
      a first storage device for storing metal catalysts to be supplied to the supplying device; wherein the supplying device comprises
         a discharge part for storing metal catalysts and supplying a predetermined quantity of metal catalysts to the input device;
         an upper closing plate and a lower closing plate at an upper portion of the discharge part to define a set quantity space to be filled with a preset amount of supplied metal catalysts, the upper and lower closing plates defining the set quantity space by moving to open and close a top and bottom thereof, and
         a driving member for selectively moving the upper closing plate and the lower closing plate; and
   iii) a recovery unit for recovering carbon nanotubes produced in the fluid synthesizing apparatus.

5. The facility of claim 4, wherein the first storage device comprises:
   a first storage tank comprising a storage space for storing metal catalysts, and a passage connected to the supplying device; and
   a pushing device for pushing metal catalysts stored in the first storage tank into the passage.

6. The facility of claim 4, wherein the input device comprises an input pipe that uses pressure of inactive gas to input metal catalysts to the reaction chamber.

7. The facility of claim 6, wherein the input device further comprises an oscillator that applies vibrations to the input tank to facilitate extrusion of metal catalysts filled in the input tank into the input pipe.

8. The facility of claim 4, wherein the rotating member comprises:
   a driver;
   a rotating shaft installed in the reaction space of the reaction chamber, for receiving rotational force from the driver; and
   a rotating frame installed on the rotating shaft to rotate along edges of the reaction space.

9. The facility of claim 8, wherein the rotating frame comprises:
   blades disposed proximate to a sidewall of the reaction chamber, to sweep and remove metal catalysts adhered to the sidewall of the reaction chamber;
   downward wings for generating a downward current from an upper portion to a lower portion of the reaction space to prevent escaping of small metal catalyst particles from the upper portion of the reaction space; and
   upward wings for generating an upward current from the lower portion to the upper portion of the reaction space to prevent large metal catalyst particles from settling to the lower portion of the reaction space.

10. The facility of claim 8, wherein the reaction chamber comprises a dispersion plate for diffusing source gas into the reaction space, and the rotating member further comprises a floor blade disposed proximate to the dispersion plate to prevent occurrence of channeling from accumulation of metal catalysts on the dispersion plate, through sweeping metal catalysts accumulating on the dispersion plate.

11. The facility of claim 4, wherein the reaction chamber further comprises:
   a preheating space that is preheated before source gas enters the reaction space; and
   a dispersion plate that partitions the preheating space and the reaction space, and discharges source gas into the reaction space.

12. The facility of claim 11, wherein the reaction chamber further comprises a heater installed on an outside thereof, the heater separated into an upper heater and a lower heater disposed above and below the dispersion plate, respectively.

13. The facility of claim 4, further comprising an exhaust unit for exhausting exhaust gas generated during production of carbon nanotubes by the fluid synthesizing apparatus, wherein the exhaust unit comprises:
   a cyclone that collects metal catalysts exhausted together with exhaust gas; and
   a scrubber that removes and cleans exhaust gas that passes through the cyclone.

14. The facility of claim 13, wherein the cyclone comprises:
   a cylindrical cyclone body;
   an intake pipe for suctioning exhaust gas including metal catalysts into the cyclone body;
   an exhaust pipe for exhausting only exhaust gas after the suctioned exhaust gas and metal catalysts are separated from each other; and a collection chamber for collecting separated metal catalysts discharged therein.

15. The facility of claim 4, wherein the recovery unit uses negative pressure to recover carbon nanotubes produced in the reaction chamber.

16. The facility of claim 15, wherein the recovery unit comprises:
 a recovery tank; and
 a negative pressure generating member for generating negative pressure in an internal space of the recovery tank.

17. The facility of claim 16, wherein the recovery unit further comprises an electromagnet for retaining carbon nanotubes recovered in the recovery tank, to prevent carbon nanotubes from being blown around by the negative pressure generating member.

18. The facility of claim 15, wherein the recovery unit further comprises a cooling member for preventing combustion of carbon nanotubes.

19. The facility of claim 16, wherein the recovery unit further comprises:
 a large-capacity storage tank; and
 a transferring member for transferring carbon nanotubes in the recovery tank to the large-capacity storage tank through a descension method, a pressurizing method, or an electromagnetic method.

\* \* \* \* \*